United States Patent
Glasco et al.

(10) Patent No.: US 8,700,862 B2
(45) Date of Patent: Apr. 15, 2014

(54) COMPRESSION STATUS BIT CACHE AND BACKING STORE

(75) Inventors: David B. Glasco, Austin, TX (US);
Peter B. Holmqvist, Cary, NC (US);
George R. Lynch, Raleigh, NC (US);
Patrick R. Marchand, Apex, NC (US);
Karan Mehra, Cary, NC (US); James Roberts, Austin, TX (US)

(73) Assignee: Nvidia Corporation, Santa Clara, CA (US)

(*) Notice: Subject to any disclaimer, the term of this patent is extended or adjusted under 35 U.S.C. 154(b) by 352 days.

(21) Appl. No.: 12/327,790

(22) Filed: Dec. 3, 2008

(65) Prior Publication Data
US 2010/0138614 A1    Jun. 3, 2010

(51) Int. Cl.
*G06F 12/00* (2006.01)

(52) U.S. Cl.
USPC ........... 711/144; 711/118; 711/119; 711/120; 711/147; 711/153; 711/154; 711/170; 711/173; 711/207

(58) Field of Classification Search
USPC ......... 711/118, 119, 120, 144, 147, 153, 154, 711/170, 173, 207
See application file for complete search history.

(56) References Cited

U.S. PATENT DOCUMENTS

| | | | |
|---|---|---|---|
| 6,795,897 B2 * | 9/2004 | Benveniste et al. | 711/118 |
| 7,702,875 B1 * | 4/2010 | Ekman et al. | 711/170 |
| 7,769,955 B2 | 8/2010 | Ozer et al. | |
| 2003/0217237 A1 * | 11/2003 | Benveniste et al. | 711/153 |
| 2005/0114601 A1 * | 5/2005 | Ramakrishnan | 711/118 |
| 2005/0144388 A1 * | 6/2005 | Newburn et al. | 711/118 |
| 2006/0004968 A1 * | 1/2006 | Vogt | 711/154 |
| 2006/0047916 A1 * | 3/2006 | Ying et al. | 711/144 |
| 2007/0016724 A1 * | 1/2007 | Gaither et al. | 711/105 |
| 2008/0016254 A1 * | 1/2008 | Kruger et al. | 709/251 |
| 2008/0104329 A1 | 5/2008 | Gaither et al. | |

FOREIGN PATENT DOCUMENTS

KR    1020080047096    5/2008

OTHER PUBLICATIONS

GPTO Search Report, GP Appl. No. 102009047200.2, mailed Aug. 16, 2010.
Search Report, GB App. No. 0920627.7, dated Mar. 5, 2010.
KIPO Office Action, KR Appl. No. 10-2009-119078, mailed Mar. 4, 2011. (Attached 2 page translation/summary from Kim & Chang letter dated Mar. 30, 2011).
Franaszek, Peter A., et al. "Directory Caching in Compressed Memory Architectures", IBM Research Report, Nov. 9, 2012 pp. 1-11 (12 pages total).
Non-Final Office Action dated Mar. 30, 2011 for U.S. Appl. No. 12/276,147.
Final Office Action dated Oct. 17, 2011 for U.S. Appl. No. 12/276,147.
Advisory Action dated Jan. 6, 2012 for U.S. Appl. No. 12/276,147.
Non-Final Office Action dated Jul. 30, 2012 for U.S. Appl. No. 12/276,147.

* cited by examiner

*Primary Examiner* — Arpan P. Savla
(74) *Attorney, Agent, or Firm* — Patterson + Sheridan, L.L.P.

(57) ABSTRACT

A compression status bit cache provides on-chip availability of compression status bits used to determine how many bits are needed to access a potentially compressed block of memory. A backing store residing in a reserved region of attached memory provides storage for a complete set of compression status bits used to represent compression status of an arbitrarily large number of blocks residing in attached memory. Physical address remapping ("swizzling") used to distribute memory access patterns over a plurality of physical memory devices is partially replicated by the compression status bit cache to efficiently integrate allocation and access of the backing store data with other user data.

24 Claims, 8 Drawing Sheets

COMPRESSION STATUS BIT CACHE AND BACKING STORE

BACKGROUND OF THE INVENTION

1. Field of the Invention

The present invention generally relates to memory systems and more specifically to a compression status bit cache and backing store.

2. Description of the Related Art

Performance requirements are constantly increasing in data processing systems, which conventionally comprise one or more processor chips and attached memory devices. The processor chip includes on-chip data processing resources and memory interface circuitry configured to enable the processing resources to access off-chip, attached memory. System performance is generally determined by the on-chip data processing performance and available bandwidth to the attached memory devices.

One technique for increasing available memory bandwidth is to interleave memory access over two or more memory partitions. When multiple on-chip clients access memory within each partition, the associated access requests may be scheduled to optimize specific parameters, such as overall system throughput or average latency for a specific client. Clients of the memory system, such as on-chip data processing resources, may post memory access requests through a switched network to one or more memory partitions. A physical address associated with a memory access request is converted to a local partition addresses using an address mapping function that is specific to a given partition configuration.

To further improve memory bandwidth, some data may be stored in a compressed format, which reduces the number of bits needed to represent a block of original data. The amount of memory allocated to store a block of original data in a compressed format is not reduced compared to an uncompressed format, but the number of bits needed to store and retrieve the compressed block of data is reduced and therefore memory bandwidth is reduced. A plurality of both loss-less and lossy compressed formats may be used, depending on specific application requirements and whether a specific block of original data is compressible under available compression algorithms. Each compression format advantageously reduces the number of bits needed to represent a block of original data stored in attached memory. However, the specific number of bits and how to interpret the bits is a function of which compression format, if any, is used to represent the block of original data. A selected compression format associated with each block is indicated by compression status bits for each block of compressible memory. In order to minimize bandwidth needed to access a given block of data within attached memory, the memory interface circuitry residing on the processor chip needs to refer to the compression status bits associated with the block of memory prior to initiating a memory access request to the attached memory.

To maximize performance, the compression status bits need to be available to the memory interface circuitry. One solution involves storing compression status bits in an on-chip random access memory (RAM), referred to herein as the compression status RAM, wherein the status bits map directly to blocks of memory within a region of compressible memory residing in the attached memory. In this solution, a given set of compression status bits within the compression status RAM indicates compression status for a directly corresponding block of physical memory within the attached memory. When the memory interface circuitry within a partition receives a memory access request, the memory interface circuitry queries the compression status RAM prior to initiating a memory access request to the attached memory.

As data processing systems increase in performance and expand overall capabilities, total attached memory is also conventionally increased. Because the on-chip compression status RAM directly map to compressible attached memory, increasing the amount of attached memory implies an increase in the size of the compression status RAM. For example, doubling the amount of attached memory should result in doubling the size of the compression status RAM to accommodate the additional blocks of potentially compressed memory. However, on-chip storage of compression status bits is relatively expensive in terms of die area and, unlike attached memory, can not be easily doubled.

Accordingly, what is needed in the art is a technique that enables a data processing system to support large amounts of attached storage without incurring die area costs that are associated with storing large numbers of directly mapped on-chip compression status bits.

SUMMARY OF THE INVENTION

One embodiment of the present invention sets forth an intermediate cache coupled to one or more clients and to an external memory and configured to access at least one data surface and a data structure storing compression information that reside within the external memory. The intermediate cache includes a compression status bit cache configured to cache compression information for blocks of memory stored within the external memory, and a data cache unit configured to request, in response to a cache miss involving a first memory access request from a client, compressed data from the external memory based on compression information associated with the first memory access request and stored in either the compression status bit cache or the data structure, where the compressed data comprises a reduced set of data for representing the requested data. The intermediate cache may also include a command crossbar configured to route a command associated with the first memory access request received from a client, and a data crossbar configured to route data associated with the first memory access request.

One advantage of the disclosed intermediate cache is that a large amount of attached memory may be allocated as compressible memory blocks, without incurring a corresponding die area cost because much of the working compression status bit backing store is off chip in attached memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
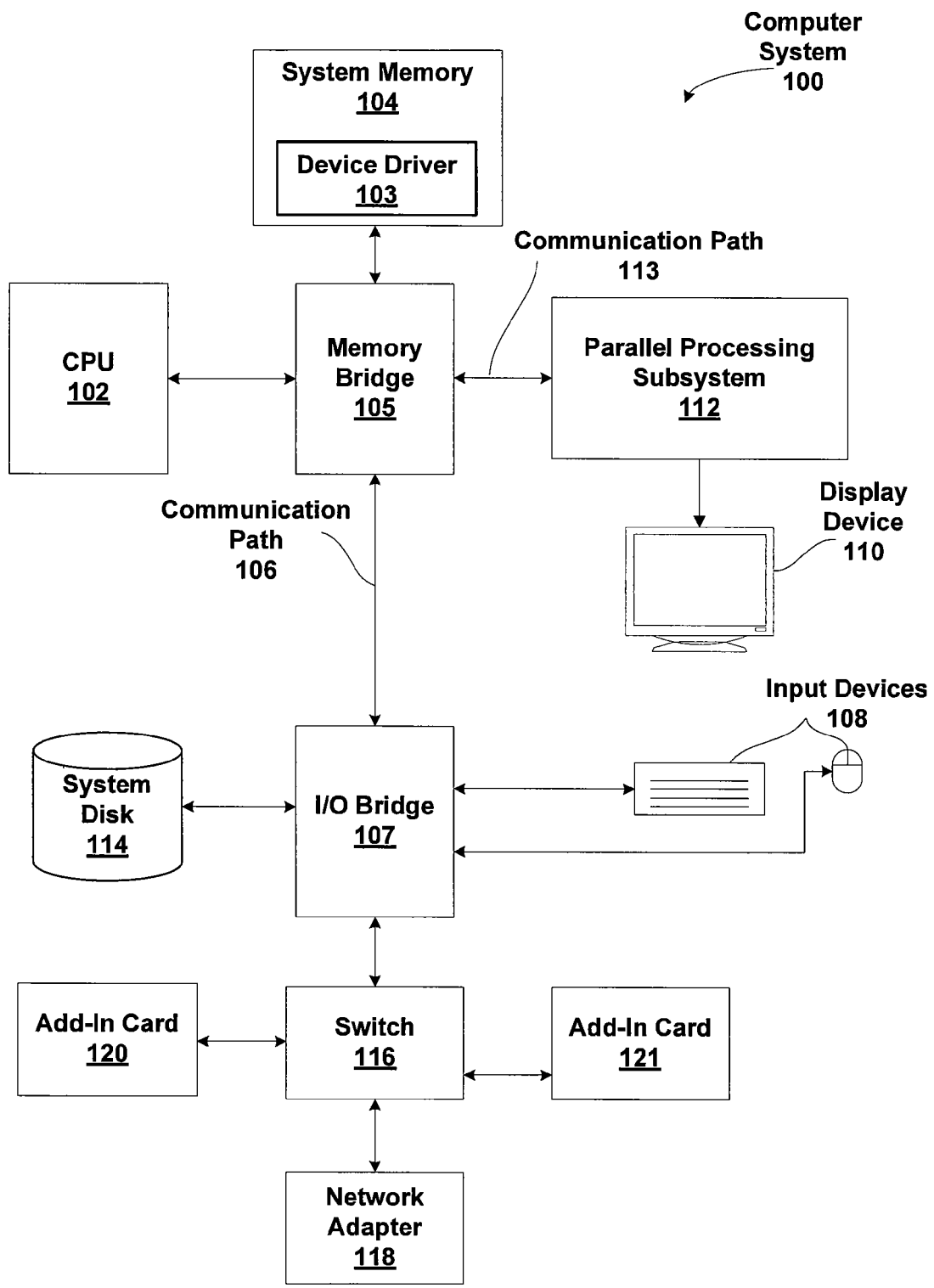
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 that includes a device driver 103. CPU 102 and system memory 104 communicate via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
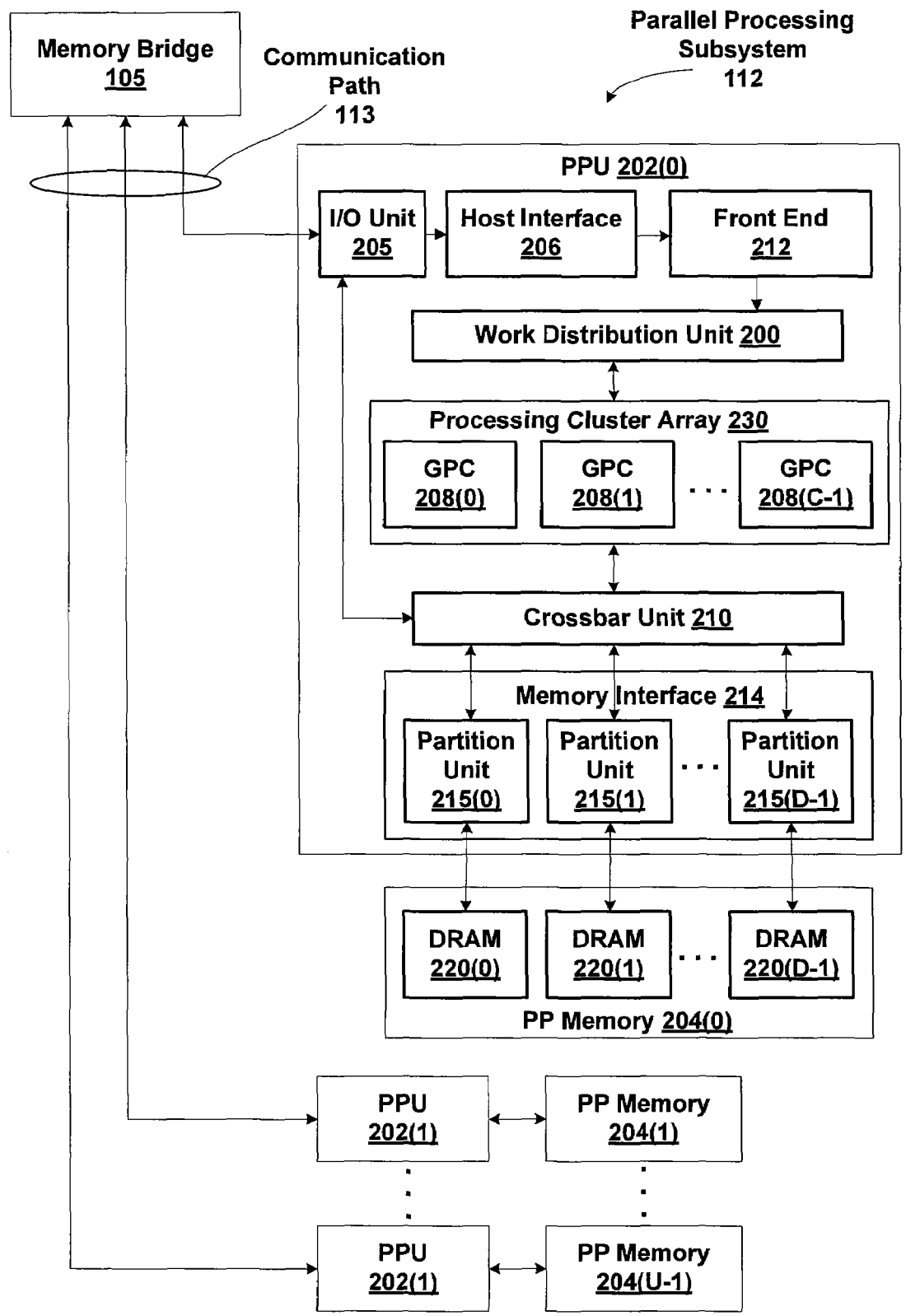
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCS) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
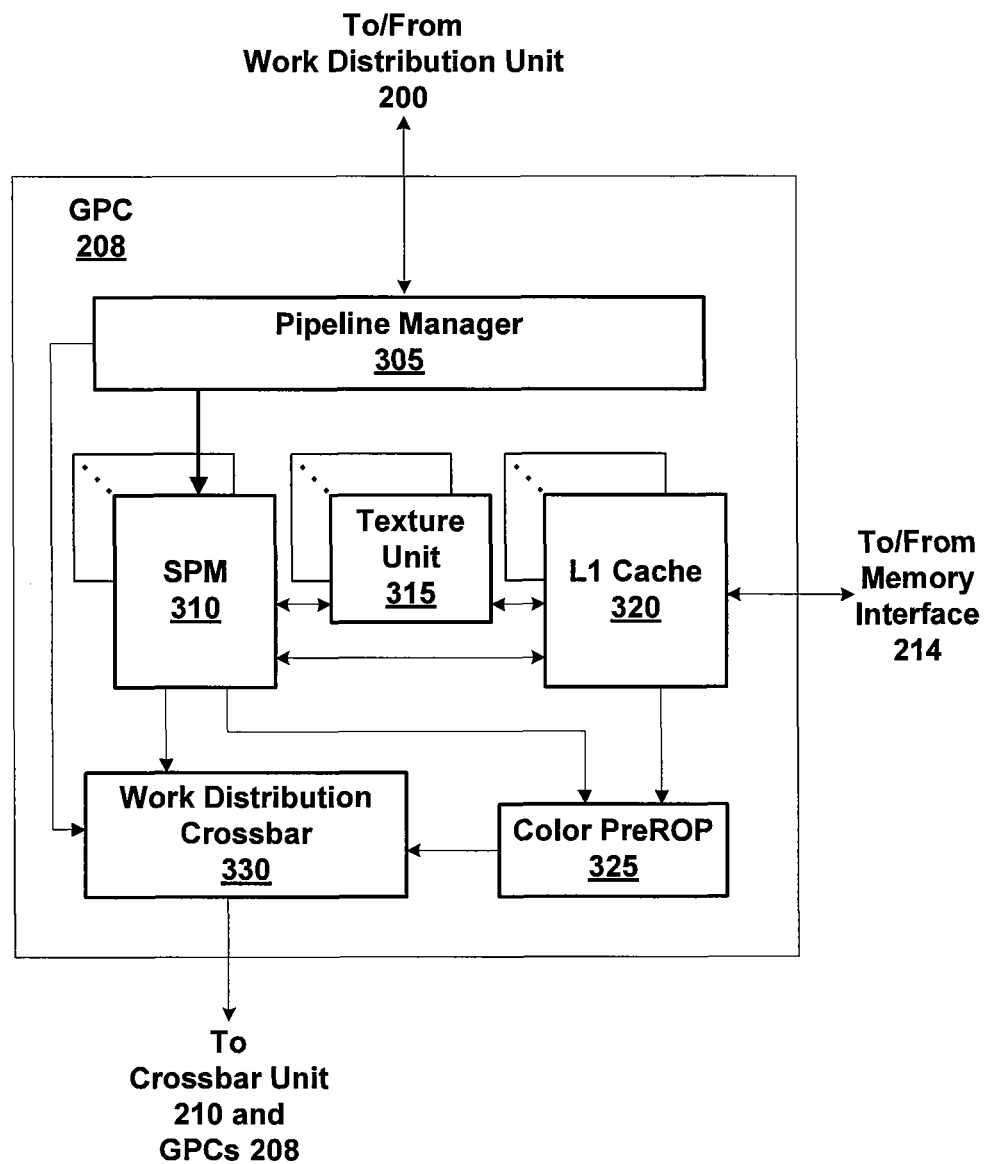
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine 304 for performing screen space graphics processing functions that may include, but are not limited to primitive setup, rasterization, and z culling. In some embodiments, primitive engine 304 is configured to gather pixels into tiles of multiple neighboring pixels before outputting the pixels to L1 cache 320 in order to improve the access efficiency of L1 cache 320. Primitive engine 304 receives a processing task from work distribution unit 200, and when the processing task does not require the operations performed by primitive engine 304, the processing task is passed through primitive engine 304 to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to GXM thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read from L1 cache 320 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A color preROP (pre-raster operations) 325 is configured to perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or color preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
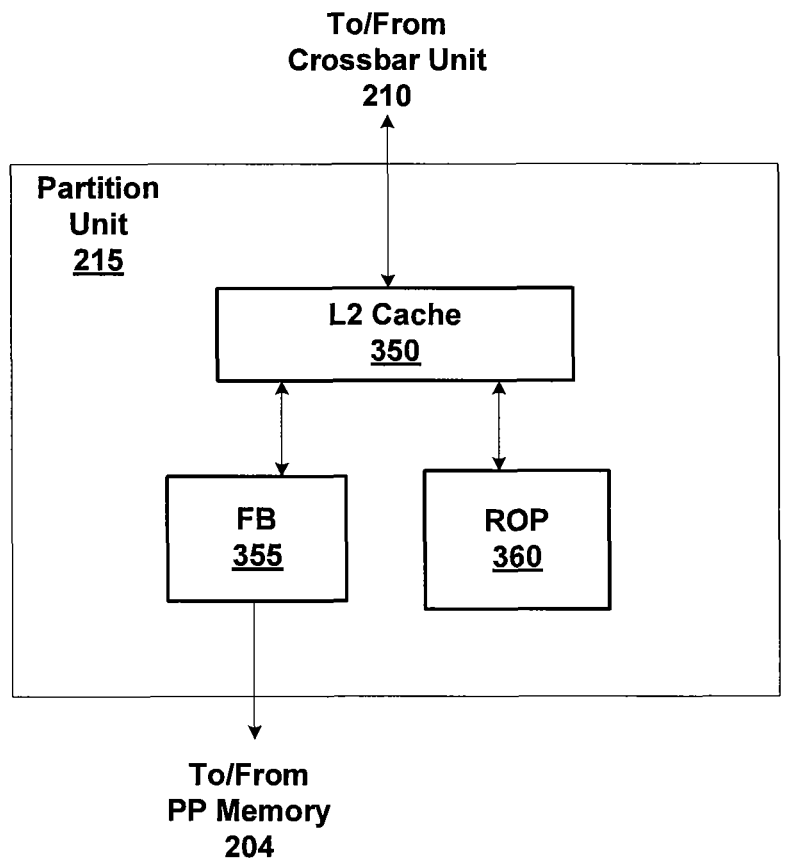
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. In some embodiments, L2 cache 350 may be split into four (or fewer) slices in order to interface with memory crossbar unit 210 at four times the bandwidth of FB 355. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, and the like, and outputs pixel data as processed graphics data for storage in graphics memory. The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 is configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Compression Status Bit Cache and Backing Store

Figure 4:
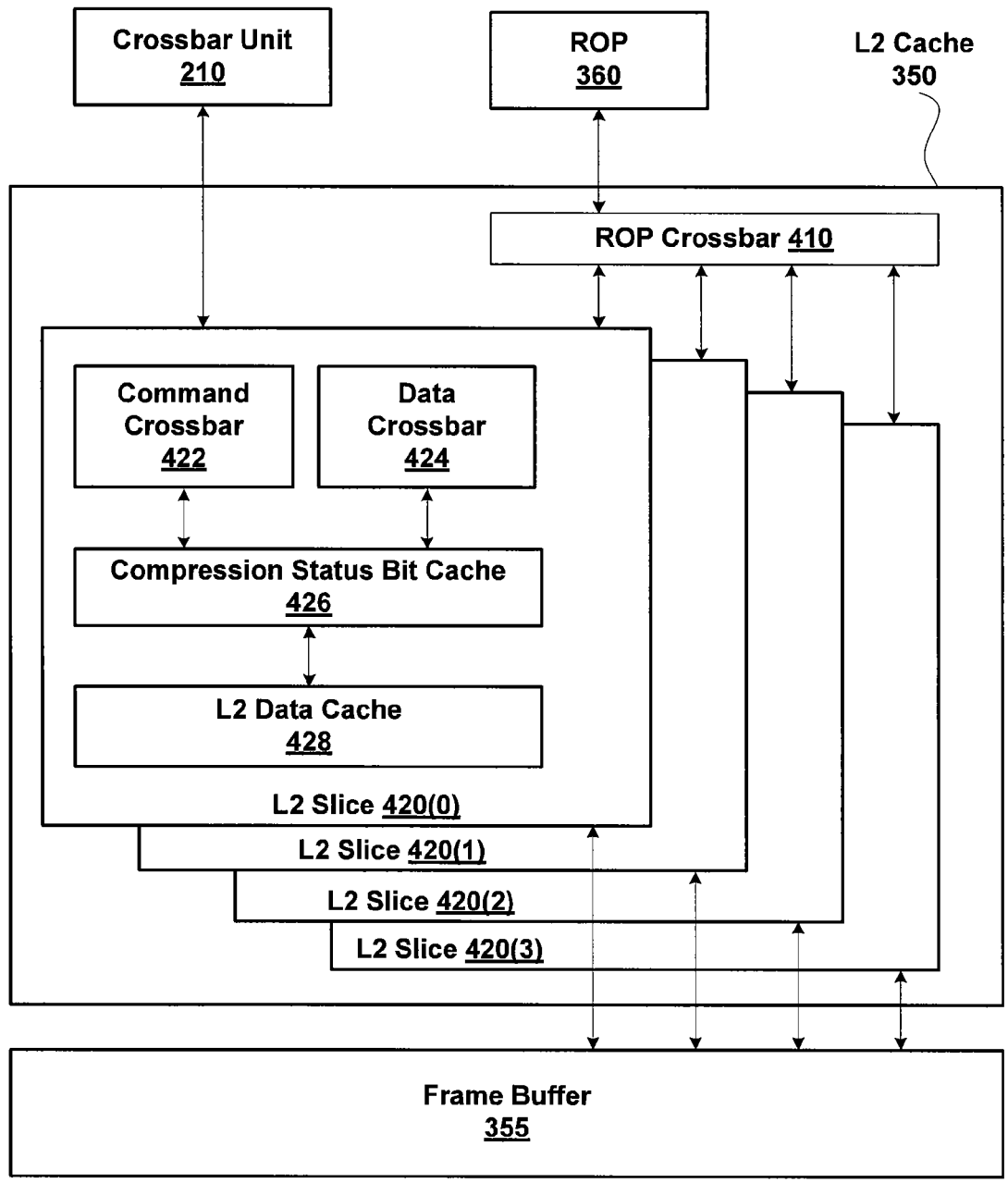
FIG. 4 is a conceptual diagram of the level two (L2) cache of FIG. 3B, according to one embodiment of the present invention.

FIG. 4 is a conceptual diagram of the level two (L2) cache 350 of FIG. 3B, according to one embodiment of the present invention. The L2 cache 350 comprises a ROP crossbar 410, and one or more L2 slices 420. In one embodiment, four L2 slices 420(0)-420(3) are included in the L2 cache 350. The L2 cache 350 receives memory access requests from a crossbar unit 210 and may receive memory access requests from at least one ROP 360. The memory access requests comprise read and write operations performed on memory blocks that may be associated with a data surface. The at least one ROP 360 presents memory access requests to the ROP crossbar 410, which distributes the requests to the L2 slices 420. In processing chips with two or more partition units, such as partition units 215 of FIG. 2, the crossbar unit 210 routes memory access requests to the two or more partition units, each including an instance of the L2 cache 350.

Each L2 slice 420 within each L2 cache 350 includes a command crossbar 422, a data crossbar 424, a compression status bit cache 426, and an L2 data cache 428. The command crossbar 422 directs a command portion of a memory access request to the compression status bit cache 426. The data crossbar 424 routes data between the compression status bit cache 426 and a memory client via the crossbar unit 210 or the ROP 360.

A backing store residing within an external DRAM, such as DRAM 220 of FIG. 2, comprises a data structure that should provide sufficient compression status bit sets to indicate compression status of all compressed memory blocks also residing in the DRAM. Each compression status bit set indicates compression status for a corresponding block of memory residing in external DRAM, which may be attached to the frame buffer 355. The compression status bit cache 426 stores cache lines from the backing store, wherein each cache line includes a plurality of compression status bit sets. One or more cache lines are organized into a cache data store, disposed within the compression status bit cache 426. If a compression status bit set associated with a memory access request from a memory client is not currently stored in the cache data store, then a compression status bit cache miss is generated. In response to a compression status bit cache miss, the compression status bit cache 426 generates a memory access request to the backing store to retrieve a cache line that includes the requested compression status bit set.

In one embodiment, two bits comprise one compression status bit set, wherein each compression status bit set can assume one of four code values given by the two bits. One code value may be used to indicate that a corresponding block of memory is not compressed, while each of the remaining three code values may indicate one of three different compression formats.

The compression status bit cache 426 may implement any technically feasible tag association scheme and any technically feasible eviction policy. Under normal operation, a memory access request to a compressed surface will pass through the compression status bit cache 426 in order to determine compression status for the requested block of memory. Based on the compression status, a memory access request is forwarded to the L2 data cache 428 for processing. A cache hit in the L2 data cache 428 may be processed locally by the L2 data cache 428, while a cache miss in the L2 data cache 428 results in a memory access request being generated and posted to the frame buffer 355. Any technically feasible replacement policy and association mechanism may be used within the L2 data cache 428.

Importantly, if the L2 data cache 428 misses, only the number of bits needed by a compressed representation of a corresponding cache line needs to be requested by the L2 data cache 428. The number of bits needed for a memory request initiated by the L2 data cache 428 is indicated by a compression status bit set residing within the compression status bit cache 426. By limiting a memory request size to include only bits needed by a compressed representation of a requested block of memory, bandwidth demands on PP memory 204 are reduced.

Certain memory clients, such as ROP 360, are compression aware and are able to directly read and write compressed data. Other clients are compression naïve and are not able to process compressed data directly. For example, the GPCs 208 of FIG. 2 are generally not equipped to process compressed data. If a compression aware memory client requests a read or write operation to a compressed block of memory, the L2 cache 350 may reply with compressed data. If, however, a compression naïve memory client requests a read from a compressed block of memory, the L2 cache 350 decompresses data within the compressed block of memory and returns decompressed data to the naïve memory client. In certain instances, a compression naïve memory client may only write uncompressed data back to any given block of memory.

Figure 5:
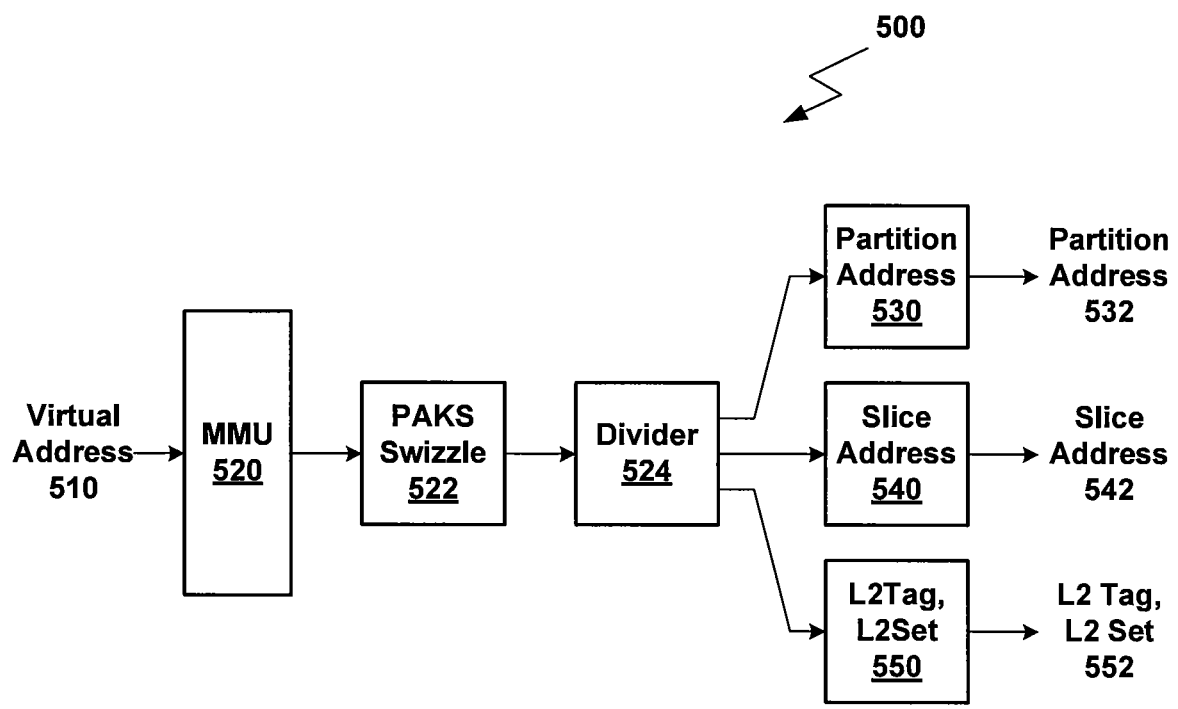
FIG. 5 is a conceptual diagram of a virtual address to raw partition address conversion pipeline, according to one embodiment of the present invention.

FIG. 5 is a conceptual diagram of a virtual address to raw partition address conversion pipeline 500, according to one embodiment of the present invention. The virtual address to raw partition address conversion pipeline 500 includes a memory management unit (MMU) 520, a physical address kind swap swizzle unit (PAKS swizzle) 522, a divider 524, a partition address unit 530, a slice address unit 540, and a L2 tag, L2 set unit 550. In one embodiment, each GPU 208 of FIG. 2 includes an MMU unit.

The MMU 520 includes a set of page table entries (PTEs) used to map a virtual address 510 to a physical address. Each PTE includes, without limitation, virtual address to physical address mapping information, surface kind information, and compression tag line information. The physical address is processed by the PAKS swizzle 522 to generate a swizzled physical address that distributes access locality to allow efficient request interleaving among partition units. The divider generates a quotient and remainder used by the partition address unit 530, the slice address unit 540, and the L2 tag, L2 set unit 550 to compute a unique DRAM address. The partition address unit 530 computes a partition address 532 that is used to route a corresponding memory access request to one partition unit 215 of FIG. 2. The slice address unit 540 computes a slice address 542 that is used to route the memory access request to one selected L2 slice 420 of FIG. 4.

The L2 tag, L2 set unit 550 receives a slice-specific physical address comprising a quotient from divider 524 and an offset address for the memory access request. The L2 tag, L2 set unit 550 computes an L2 tag and L2 set 552, corresponding to a raw partition address that may be used to access a specific DRAM 220 device. The L2 tag and L2 set 552 may also be used to query the L2 data cache 428 of FIG. 4.

Figure 6:
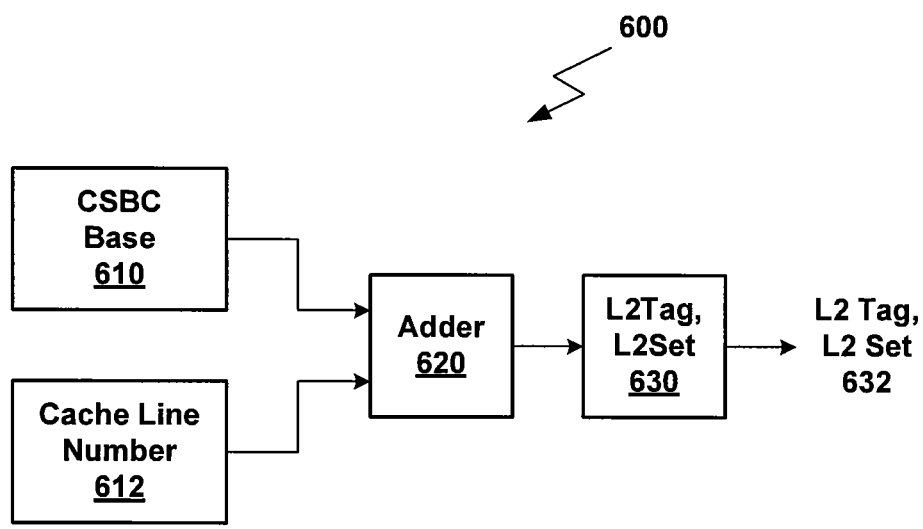
FIG. 6 is a conceptual diagram of a raw partition address generation pipeline for a compression status bit cache, according to one embodiment of the present invention.

FIG. 6 is a conceptual diagram of a raw partition address generation pipeline 600 for a compression status bit cache, according to one embodiment of the present invention. A compression status bit cache (CSBC) base 610 comprises an offset address for the backing store used to store compression status bits. A cache line number 612 is arithmetically added to the CSBC base 610 by adder 620 to compute a slice-specific physical address that may be processed by an L2 tag, L2 set unit 630 to generate an L2 tag, L2 set address 632 corresponding to a raw partition address that may be used to access a specific DRAM 220 device. The L2 tag, L2 set unit 630 performs substantially identical computation on the slice-specific physical address versus the L2 tag, L2 set unit 550 of FIG. 5. Importantly, both the L2 tag, L2 set unit 630 and L2 tag, L2 set unit 550 receive slice-specific physical addresses of identical form and perform substantially identical address bit manipulation on the slice-specific physical addresses to generate raw partition addresses of identical form. This symmetry allows both units to address blocks of data within the same partition without address space collisions. In one embodiment, the raw partition address generation pipeline 600 is implemented within the compression status bit cache 426 of FIG. 4.

The cache line number 612 is derived from the compression tag line information generated by the MMU 520. The cache line number 612 associates a block of compressed memory to a set of associated compression status bits. The cache line number 612 also serves as a lookup tag used by the compression status bit cache 426 of FIG. 4.

Figure 7:
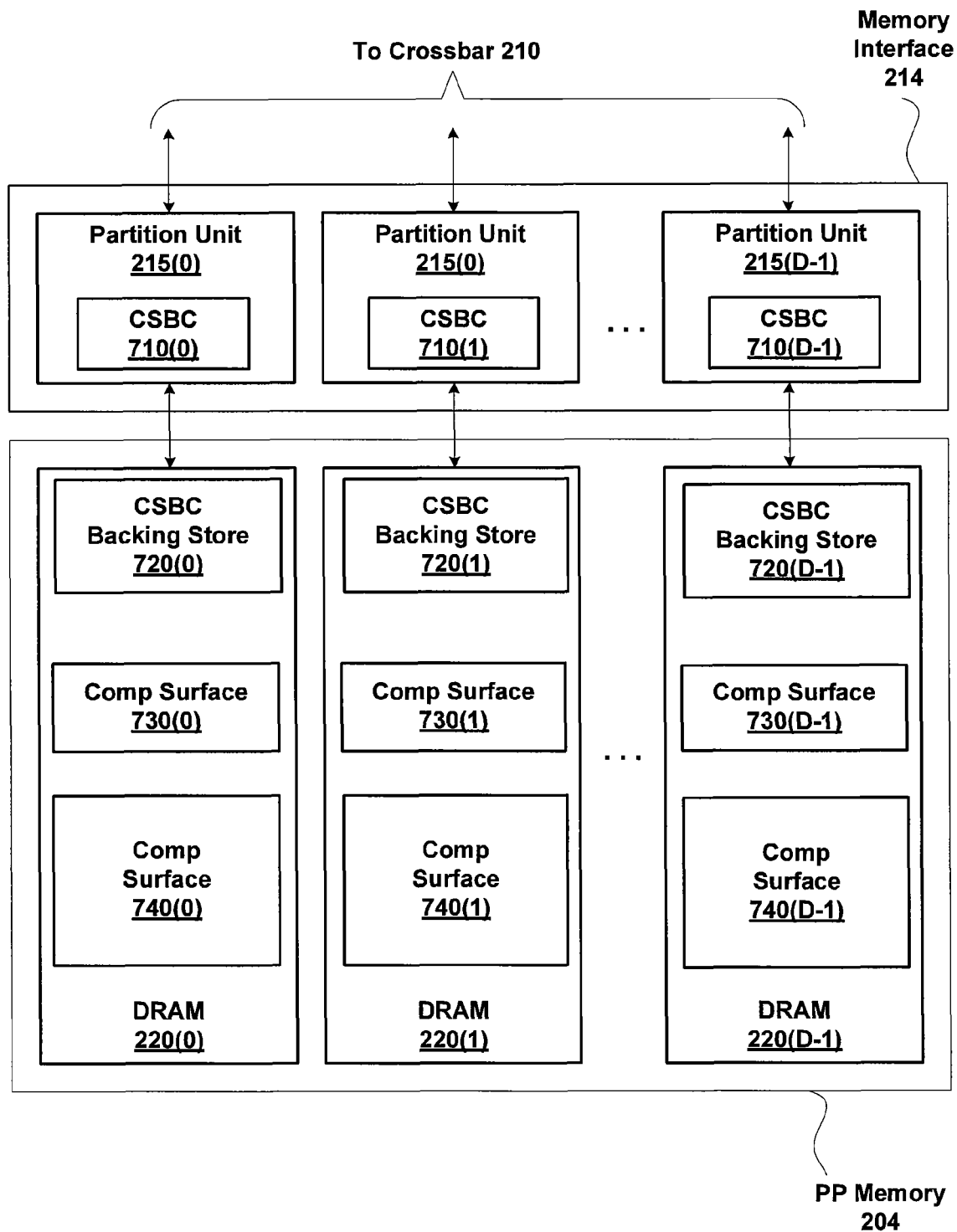
FIG. 7 illustrates allocation of compression status bit cache backing stores relative to partition association with attached parallel processor memory.

FIG. 7 illustrates allocation of compression status bit cache backing stores 720 relative to partition association with attached parallel processor memory 204. Each partition unit 215 includes a compression status bit cache (CSBC) 710 configured to provide an on-chip, cached version of compression status bits residing in a corresponding CSBC backing store 720. Each CSBC backing store 720 is configured to store compression status bits that should map exclusively to blocks of data residing in the corresponding DRAM 220. For example, CSBC backing store 720(1) includes compression status bits that map exclusively to DRAM 220(1). Additionally, CSBC 710(1) caches compression status bits that map exclusively to CSBC backing store 720(1). By contrast, compressed surfaces 730 and 740 include data that is distributed over DRAM 220(0) through DRAM 220(D−1), within PP memory 204.

Persons skilled in the art will understand that by confining which DRAM 220 stores compression status bits for blocks of data residing in the same DRAM 220, significant additional traffic over crossbar 210 may be averted, while preserving enhanced memory performance gained by distributing normal memory access requests over multiple partitions.

In sum, a technique for enabling a data processing system to support large amounts of attached storage without incurring die area costs is disclosed. A compression status bit cache is coupled to a backing store residing in external memory. The compression status bits are stored in the backing store for each block of memory stored within the same physical partition. Backing store data for a given partition should not reside in any other partition. To avoid partition address aliasing, blocks of memory within the backing store are remapped ("swizzled") according to an identical remapping function used for all other partition addresses within a given partition.

One advantage of the present invention is that a large amount of attached memory may be allocated as compressible memory blocks, without incurring a corresponding die area cost because much of the working compression status bit backing store is off chip in attached memory. A second advantage is that this technique is operable with high-performance partition and slice-based virtual memory architectures.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A plurality of intermediate caches coupled to one or more clients, each intermediate cache comprising:
   a compression status bit cache configured to cache compression information for blocks of memory stored within a corresponding one of a plurality of portions of external memory; and a data cache unit configured to request, in response to a cache miss in the data cache unit involving a first memory access request received from a first client, compressed data from the corresponding one of the plurality of portions of external memory based on compression information associated with the first memory access request and stored in either the compression status bit cache or a data structure residing in the corresponding one of the plurality of portions of external memory, wherein the compression information indicates the number of bits that comprise the compressed data, and wherein the compressed data comprises a reduced set of data for representing the requested data, wherein each intermediate cache is coupled to the one or more clients via a memory crossbar and to the corresponding one of the plurality of portions of external memory, and wherein each intermediate cache is configured to access at least one data surface and the data structure storing compression information for and residing in the corresponding one of the plurality of portions of external memory.

2. The plurality of intermediate caches of claim 1, each intermediate cache further comprising a command crossbar configured to route a command associated with the first memory access request received from the first client.

3. The plurality of intermediate caches of claim 2, each intermediate cache further comprising a data crossbar configured to route data associated with the first memory access request.

4. The plurality of intermediate caches of claim 3, each intermediate cache further comprising a set and tag unit configured to perform a first remapping operation on a memory address associated with the first memory access request to produce a first physical memory address for the first memory access request.

5. The plurality of intermediate caches of claim 4, wherein the compression status bit cache is configured to receive from a memory management unit a tag line associated with the first memory access request and to derive a cache tag from the tag line.

6. The plurality of intermediate caches of claim 5, wherein the tag line resides within a page table entry that is stored within the memory management unit and is generated during a virtual address to physical address translation performed by the memory management unit.

7. The plurality of intermediate caches of claim 6, wherein the compression status bit cache is configured to determine, based on the cache tag, whether the compression information associated with the first memory access request is currently stored within the compression status bit cache or the data structure.

8. The plurality of intermediate caches of claim 7, wherein the compression information associated with the first memory access request is stored within the data structure, and the compression status bit cache is configured to generate a second memory access request to retrieve the compression information from the data structure.

9. The plurality of intermediate caches of claim 8, wherein the compression status bit cache is configured to compute an address within the data structure from where the compression information associated with the first memory access request may be retrieved by adding an offset to an index derived from the tag line.

10. The plurality of intermediate caches of claim 9, wherein a second physical memory address for the second memory access request is computed by performing the first remapping operation on the address within the data structure from where the compression information associated with the first memory access request may be retrieved.

11. The plurality of intermediate caches of claim 10, wherein the compression status bit cache reads the compression information associated with the first memory access request from the data structure based on the second physical memory address via the second memory access request and stores the compression information within a data store residing in the compression status bit cache.

12. The plurality of intermediate caches of claim 11, wherein the data cache unit reads compressed data from the corresponding one of the plurality of portions of external memory based on the first physical memory address via the first memory access request and stores the compressed data within the data cache unit according to the compression information.

13. The plurality of intermediate caches of claim 12, wherein the data cache unit transmits compressed data to the first client, if the first client is configured to receive compressed data, and decompresses the compressed data and transmits the decompressed data to the first client, if the first client is not configured to receive compressed data.

14. The plurality of intermediate caches of claim 7, wherein the compression information associated with the first memory access request is stored within the compression status bit cache, and the compression status bit cache is configured to transmit the compression information to the data cache unit.

15. The plurality of intermediate caches of claim 14, wherein the data cache unit reads compressed data from the corresponding one of the plurality of portions of external memory based on the first physical memory address via the first memory access request and stores the compressed data within the data cache unit according to the compression information.

16. The plurality of intermediate caches of claim 3, wherein the compression information associated with the first memory access request comprises two bits that encode one of four compression status states.

17. The plurality of intermediate caches of claim 16, wherein one compression status state is defined to indicate that no compression is applied to an associated block of memory.

18. A computing device, comprising:
one or more clients;
a plurality of intermediary caches, each intermediate cache including:
a command crossbar configured to route a command associated with a first memory access request received from a first client,
a data crossbar configured to route data associated with the first memory access request,
a compression status bit cache configured to cache compression information for blocks of memory stored within a corresponding one of a plurality of portions of external memory, and
a data cache unit configured to request, in response to a cache miss in the data cache unit, compressed data from the corresponding one of the plurality of portions of external memory based on compression information associated with the first memory access request and stored in either the compression status bit cache or a data structure residing in the corresponding one of the plurality of portions of external memory, wherein the compression information indicates the number of bits that comprise the compressed data, and wherein the compressed data comprises a reduced set of data for representing the requested data, wherein each intermediate cache is coupled to the one or more clients via a crossbar unit and to the corresponding one of the plurality of portions of external memory, and wherein each intermediate cache is configured to access at least one data surface and the data structure storing compression information for and residing in the corresponding one of the plurality of portions of external memory.

19. The computing device of claim 18, wherein the compression status bit cache is further configured to determine, based on a cache tag, whether the compression information associated with the first memory access request is currently stored within the compression status bit cache or the data structure, and wherein the cache tag is derived from a tag line associated with the first memory access request received from a memory management unit, and the tag line is generated during a virtual address to physical address translation performed by the memory management unit.

20. The computing device of claim 19, wherein the compression information associated with the first memory access request is stored within the data structure, the compression status bit cache is further configured to:

generate a second memory access request to retrieve the compression information from the data structure, compute an address within the data structure from where the compression information associated with the first memory access request may be retrieved by adding an offset to an index derived from the tag line, compute a second physical memory address for the second memory access request by performing the first remapping operation on the address within the data structure from where the compression information associated with the first memory access request may be retrieved, read the compression information associated with the first memory access request from the data structure based on the second physical memory address via the second memory access request, and store the compression information within a data store residing in the compression status bit cache, and the data cache unit is further configured to:

read compressed data from the corresponding one of the plurality of portions of external memory based on the first physical memory address via the first memory access request, and store the compressed data according to the compression information.

21. The computing device of claim 19, wherein the compression information associated with the first memory access request is stored within the compression status bit cache, the compression status bit cache is further configured to transmit the compression information to the data cache unit, and the data cache unit is further configured to read compressed data from the corresponding one of the plurality of portions of external memory based on the first physical memory address via the first memory access request, and store the compressed data according to the compression information.

22. The computing device of claim 19, wherein the compression information associated with the first memory access request comprises two bits that encode one of four compression status states.

23. The computing device of claim 18, wherein the data cache unit transmits compressed data to the first client, if the first client is configured to receive compressed data, and decompresses the compressed data and transmits the decompressed data to the first client, if the first client is not configured to receive compressed data.

24. The plurality of intermediate caches of claim 1, wherein the data cache unit is an L2 data cache.

* * * * *